United States Patent
Lindoff et al.

(10) Patent No.: US 7,675,891 B2
(45) Date of Patent: Mar. 9, 2010

(54) MULTIMEDIA RECEPTION IN COMMUNICATION NETWORKS

(75) Inventors: Bengt Lindoff, Bjärred (SE); Richard Ewald, Lund (SE); Johan Udèn, Åkarp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 205 days.

(21) Appl. No.: 11/226,484

(22) Filed: Sep. 14, 2005

(65) Prior Publication Data

US 2006/0072509 A1    Apr. 6, 2006

Related U.S. Application Data

(60) Provisional application No. 60/612,160, filed on Sep. 23, 2004.

(51) Int. Cl.
 *H04W 4/00* (2009.01)
(52) U.S. Cl. .................. 370/338; 370/331; 370/332; 455/436; 455/442; 455/453; 455/439; 455/522
(58) Field of Classification Search .......... 370/338, 370/331, 328; 455/436, 442, 453, 439, 522
See application file for complete search history.

(56) References Cited

U.S. PATENT DOCUMENTS

| 5,359,607 | A * | 10/1994 | Nguyen et al. ............ 714/708 |
| 5,903,832 | A * | 5/1999 | Seppanen et al. ......... 455/435.3 |
| 6,961,019 | B1 * | 11/2005 | McConnell et al. ....... 342/357.1 |
| 2002/0010763 | A1 | 1/2002 | Salo et al. |
| 2002/0132636 | A1 * | 9/2002 | Stockhusen ............... 455/553 |
| 2003/0021286 | A1 | 1/2003 | Boscovic et al. |
| 2003/0096614 | A1 | 5/2003 | Paila |
| 2003/0133043 | A1 * | 7/2003 | Carr ......................... 348/563 |
| 2003/0223394 | A1 * | 12/2003 | Parantainen et al. ........ 370/336 |
| 2004/0023665 | A1 * | 2/2004 | Simmonds et al. ....... 455/456.1 |
| 2004/0085926 | A1 | 5/2004 | Hwang et al. |
| 2004/0103435 | A1 | 5/2004 | Yi et al. |
| 2004/0105402 | A1 | 6/2004 | Yi et al. |
| 2004/0127243 | A1 | 7/2004 | Sarkkinen |
| 2004/0136392 | A1 * | 7/2004 | Diachina et al. ........... 370/431 |
| 2004/0152473 | A1 | 8/2004 | Kuwano et al. |

(Continued)

FOREIGN PATENT DOCUMENTS

DE    103 14 159 A1    10/2004

(Continued)

OTHER PUBLICATIONS

3GPP Technical Specification TS 23.246 "Multiimedia Broadcast/Multicast Service (MBMS); Architecture and functional description", V6.6.0, Rel. 6, Mar. 2005.

(Continued)

*Primary Examiner*—Rafael Pérez-Gutiérrez
*Assistant Examiner*—Nimesh Patel
(74) *Attorney, Agent, or Firm*—Potomac Patent Group PLLC (57) ABSTRACT

Functionalities for a user equipment (UE) in a communication system in order to be able to receive broadcast information, such as TV and other multimedia, with good quality are described. In particular, methods and apparatus that schedule system measurement procedures such that the risk of interrupting the broadcast reception is minimized are described.

24 Claims, 4 Drawing Sheets

U.S. PATENT DOCUMENTS

| | | |
|---|---|---|
| 2004/0158855 A1 | 8/2004 | Gu et al. |
| 2004/0190469 A1 | 9/2004 | Pekonen et al. |
| 2004/0202140 A1 | 10/2004 | Kim et al. |
| 2004/0223513 A1 | 11/2004 | Meago |
| 2004/0227618 A1 | 11/2004 | Hwang et al. |
| 2004/0228294 A1 | 11/2004 | Kim et al. |
| 2004/0229629 A1 | 11/2004 | Yi et al. |
| 2005/0090278 A1* | 4/2005 | Jeong et al. ............... 455/525 |
| 2006/0062179 A1 | 3/2006 | Simonsson |
| 2006/0126590 A1* | 6/2006 | Putcha et al. ............. 370/343 |

FOREIGN PATENT DOCUMENTS

| | | |
|---|---|---|
| EP | 1 463 359 A1 | 9/2004 |
| WO | 01/74108 A1 | 10/2001 |
| WO | 02/080609 A1 | 10/2002 |
| WO | 03/044616 A2 | 5/2003 |
| WO | 03/045079 A1 | 5/2003 |
| WO | 2004/017581 A1 | 2/2004 |
| WO | 2004/032552 A1 | 4/2004 |
| WO | 2004/036843 A1 | 4/2004 |
| WO | 2004/077857 A1 | 9/2004 |
| WO | 2004/088997 A2 | 10/2004 |
| WO | 2004100400 A1 | 11/2004 |

OTHER PUBLICATIONS

Bakhuizen, M. et al., Mobile Broadcast/Multicast in Mobile Networks:, Ericsson Review vol. 82, No. 1, pp. 6-13, 2005.

3GPP Technical Specification TS 26.234 "Transparent end-to-end Packet-switched Streaming Service (PSS); Protocols and codecs", V6.3.0, Rel. 6, Mar. 2005.

"Digital Video Broadcasting (DVB); Transmission System for Handheld Terminals (DVB-H)", ETSI EN 302 304 V1.1.1, Jun. 2004.

"IPDC in DVB-H: Technical requirements", DVB Project, Apr. 2004.

"IP Datacast Baseline Specification; PSI/SI Guidelines for DVB-T/H Systems", DVB Document A079, DVB Project, Apr. 2004.

3GPP Technical Specification TS 04.64 V8.7.0, General Packet Radio Service (GPRS); Mobile Station—Serving GPRS Support Node (MS0SGSN) Logical Link Control (LLC) layer specification, Rel. 99, Dec. 2001.

PCT International Search Report, mailed Feb. 2, 2006, in connection with International Application No. PCT/ EP2005/009952.

PCT Written Opinion, mailed Feb. 2, 2006, in connection with International Application No. PCT/EP2005/009952.

3GPP Technical Specification TS 45.008 V6.9.0, 3rd Generation Partnership Project; Technical Specification Group GSM Edge Radio Access Network Radio Subsystem Link Control (Release 6), Online! Sep. 22, 2004, pp. 52-62, XP002363714. Retrieved from the internet: http://www.3gpp.org/ftp/Specs/archive/45_series/45.008/45008-690.zip.

3GPP Technical Specification TS 25.304 V6.2.0, 3rd Generation Partnership Project; Technical Specification Group Radio Access Network; User Equipment (UE) Procedures in Idle Mode and Procedures for Cell Reselection in Connected Mode (Release 6), Online! Jun. 17, 2004, XP002363715. Retrieved from the internet: http://www.3gpp.org/ftp/Specs/archive/25_series/25.304/25304-630.zip.

Czerepinski, P.J. et al., Coverage and planning aspects of MBMS in UTRAN', Fifth IEE International Conference on 3G Mobile Communication Technologies (3G 2004), p. 529-533, London, UK, Oct. 18-20, 2004, ISBN: 0 86341 388 9.

Vare, Jani et al., "Soft Handover in Terrestrial Broadcast Networks," 2004 IEEE International Conference on Mobile Data Management (MDM'04), p. 236, 2004.

"Transmission System for Handheld Terminals (DVB H)", White Paper, DVB-A081, Jun. 2004.

Annamalai, Magesh, "Multimedia Broadcast Multicast Service (MBMS) in GSM based Wireless Networks" USA, 2004.

"Adding DVB-H compatibility to the DVB-T modulator: An overview of the required R&D" White Paper, DVB-H172, ProTelevision Technologies, Denmark, 2003.

\* cited by examiner

MULTIMEDIA RECEPTION IN COMMUNICATION NETWORKS

This application claims the benefit of U.S. Provisional Patent Application No. 60/612,160, filed on Sep. 23, 2004, which is incorporated in its entirety here by reference.

BACKGROUND

This application relates to mobile communication systems and in particular to television broadcasts and user equipment suitable for receiving such broadcasts in such communication systems.

"Broadcast-like" television (TV) services, which is to say, services with a conventional-television-channel concept, are already available for some mobile telephony networks. For example, the Mobile TV service of Telecom Italia Mobile (TIM) provides TIM subscribers with streaming content, enabling subscribers to watch TV shows on their mobile phones via GSM's general packet radio service (GPRS) technology. Another example is sports-team goal notification services, such as that provided by Vodafone, which uses GSM's multimedia messaging service (MMS). These current implementations are based on real-time streaming over unicast GPRS bearers, but capacity limits on application servers and core and radio access networks constrain service expansion and build-out. A few network operators currently deliver broadcast-like services in wideband code division multiple access (WCDMA) communication systems by circuit-switched (CS) streaming.

A multimedia broadcast/multicast service (MBMS) in GSM and WCDMA communication systems is currently standardized by the Third Generation Partnership Project (3GPP) in Technical Specification (TS) 23.246 "Multimedia Broadcast/Multicast Service (MBMS); Architecture and functional description", V6.6.0, Rel. 6 (March 2005). According to the specification, MBMS is a point-to-multipoint service, in which data is transmitted from a single source entity to multiple recipients. Transmitting the same data to multiple recipients allows network resources to be shared, and the MBMS bearer service has broadcast and multicast modes. With MBMS, a complete set of multicast and broadcast services can be offered in telecommunication systems, such as UMTS and mobile telephony systems according to the GSM, Enhanced Data Rates for GSM Evolution (EDGE), and WCDMA specifications. The GSM EDGE radio access network is usually abbreviated as GERAN. Changes to network architecture as well as additional service-related signaling will be introduced to the existing systems by deployment of MBMS. Aspects of MBMS are described in M. Bakhuizen et al., "Mobile Broadcast/Multicast in Mobile Networks", Ericsson Review vol. 82, no. 1, pp. 6-13 (2005).

Audio and video coder/decoders (codecs) used for streaming sessions for the small display screens typical of handheld devices are improving and are standardized by the 3GPP, e.g., TS 26.234 "Transparent end-to-end Packet-switched Streaming Service (PSS); Protocols and codecs", V6.3.0, Rel. 6 (March 2003). Current implementations like the TIM Mobile TV service use streams that have data rates of 28 kilobits per second (kbps), but for very high quality content, the data rate needed is probably more than 100 kbps. For an intermediate level of quality, a data rate of 40-64 kbps is needed for a stream comprising both audio and video. For example, 12 kbps could be used for stereo audio encoded according to an adaptive multi-rate wideband codec (AMR-WB+) and 32 kbps for video encoded according to an MPEG 4 codec. Considering user sensitivity to errors in such streams, a block error rate (BLER) of 1% 2% or less may be needed for acceptable performance.

Another ongoing standardization activity is the Digital Video Broadcasting (DVB) Project, which aims at including DVB receivers in mobile terminals (MTs), such as mobile telephones. A recent standard is "Digital Video Broadcasting (DVB); Transmission System for Handheld Terminals (DVB-H)", ETSI EN 302 304 V1.1.1 (June 2004). This is an extension of the current DVB-terrestrial (DVB-T) standard to support handheld devices and introduces a new transmission mode, IP datacasting (IPDC), which is described in "IPDC in DVB-H: Technical requirements", DVB Project (June 2004). IPDC is the end-to-end DVB system, including a mobile interaction channel for mobile handheld broadcast services. See also "IP Datacast Baseline Specification; PSI/SI Guidelines for DVB-T/H Systems", document A079, DVB Project (April 2004). For even more information, the interested reader is directed to http:/www.dvb.org.

Moreover, inclusion of a separate DVB-H receiver in a user terminal also requires new terminal hardware and antennas. Different antennas might be needed in different countries due to spectrum allocations. Interoperability testing and verification due to new network nodes will delay introduction. Local distribution of programs/channels will be costly due to needed modifications of network structure, which is typically designed for national or regional coverage.

Compared with DVB-H and DVB-T, GERAN/UTRAN MBMS has a lower data rate. On the other hand, GERAN/UTRAN MBMS can transmit different information in each cell. Thus, GERAN/UTRAN MBMS is suitable for broadcasting content that is locally variable or broadcast/multicast-group dependent. UTRAN, or the UMTS Terrestrial Radio Access Network, is part of the Universal Mobile Telecommunication System (UMTS) and identifies the part of the network that includes radio network controllers (RNCs) and so-called Node Bs, which are analogous to base stations in other mobile telephone systems. UMTS is one of the third generation (3G) mobile telephone systems being developed within the IMT-2000 framework of the International Telecommunications Union (ITU) and standardized by the 3GPP.

Even so, to be competitive with DVB-H, the performance of cellular broadcast bearers can stand improvement. Dedicated unicast channels in either Enhanced GPRS (EGPRS) or WCDMA systems are difficult to use for mobile TV streaming because such channels will not scale to large usage. This problem of capacity limitations in the radio network is helped by MBMS, which provides one dedicated channel for each group of terminals receiving the same content. Nevertheless, a separate channel for a program guide or service description is also needed. Channel switching may also be slow with the currently standardized MBMS due to delays caused by restart of streaming sessions.

Communication systems that comply with the GSM/EDGE standards and provide TV broadcasts are described in U.S. Provisional Patent Application No. 60/612,161, filed on Sep. 23, 2004, and U.S. patent application Ser. No. 11/226, 485, filed on Sep. 14, 2005, both by A. Simonsson et al. for "Transparent TV Broadcast Structure in GSM/EDGE Networks". Those patent applications, which are expressly incorporated in their entirety here by reference and are called "the Simonsson application" in this patent application, describe an existing short message service (SMS) broadcast channel that is typically carried by timeslot zero (TS0) on a broadcast control channel (BCCH) in a GSM/EDGE or similar communication system can be extended with additional timeslots, and these additional timeslots can be pointed out in a tree structure, the root of which is in the SMS broadcast channel. A BCCH typically carries overhead messages, e.g., paging or call alert messages, as well as text messages like SMS, directed to individual terminals.

Such an extended BCCH can be used for broadcast-like services and has no need for interaction between communication terminals, such as mobile telephones, and the infrastructure part of the communication system, such as base stations or Node Bs. A terminal receives only the broadcast channels that the base station transmits. In this way, ordinary EGPRS channels can be set up from a media server to the broadcast channels in the base stations. The number of channels, channel content, and the channel structure can be defined by a system operator by suitable dimensioning and program production. A terminal can select a broadcast channel and cache, or store, broadcast content with a suitable software application executing in the terminal. Also, the same or another software application can select the best frequency to receive, and thus in effect cause a handover of the terminal.

SUMMARY

Additional functionalities are advantageous for a user equipment (UE) in a communication system such as that described in the Simonsson application in order to be able to receive broadcast information, such as TV and other multimedia, with good quality.

In one aspect of this invention, there is provided a method of scheduling received signal measurements in a UE in a communication system, the received signal including broadcast information and being organized in successive frames. The method includes the steps of evaluating a received signal strength indicator (RSSI) at time instants outside of a broadcast information reception time; based on the evaluated RSSI, carrying out a cell re-selection procedure; and changing a reception frequency to a frequency of a new cell, including checking a list of neighbor cells for the new cell and searching for a physical channel in the new cell at time instants outside of the broadcast information reception time. If the physical channel in the new cell is found, a broadcast channel of the new cell is read and the new cell is included in the list of neighbor cells. If the physical channel is not found at time instants outside the broadcast information reception time, the broadcast information reception is interrupted by searching for the physical channel in the new cell at time instants inside the broadcast information reception time.

In another aspect of this invention, there is provided a UE for receiving radio signals transmitted in a communication system and scheduling received signal measurements. The received signals include broadcast information and are organized in successive frames. The UE includes a receiver configured to produce a baseband signal from a received radio signal; a baseband processor configured to determine a RSSI; and a controller configured to evaluate the RSSI at time instants outside of a broadcast information reception time and to cause the UE to carry out a cell re-selection procedure based on the evaluated RSSI. The controller is configured to change a reception frequency to a frequency of a new cell, the change including checking a list of neighbor cells for the new cell and searching for a physical channel in the new cell at time instants outside of the broadcast information reception time; if the physical channel in the new cell is found, a broadcast channel of the new cell is read and the new cell is included in the list of neighbor cells; and if the physical channel is not found at time instants outside the broadcast information reception time, broadcast information reception is interrupted to search for the physical channel in the new cell at time instants inside the broadcast information reception time.

In yet another aspect of this invention, there is provided a computer-readable medium containing a computer program for scheduling received signal measurements in a UE in a communication system when the UE is in a predetermined broadcast information reception mode, the received signal including broadcast information and being organized in successive frames. The computer program cause the UE to perform the steps of evaluating a RSSI at time instants outside of a broadcast information reception time; based on the evaluated RSSI, carrying out a cell re-selection procedure; and changing a reception frequency to a frequency of a new cell, including checking a list of neighbor cells for the new cell and searching for a physical channel in the new cell at time instants outside of the broadcast information reception time. If the physical channel in the new cell is found, a broadcast channel of the new cell is read and the new cell is included in the list of neighbor cells. If the physical channel is not found at time instants outside the broadcast information reception time, broadcast information reception is interrupted by searching for the physical channel in the new cell at time instants inside the broadcast information reception time.

BRIEF DESCRIPTION OF THE DRAWINGS

The several features, objects, and advantages of this invention will be understood by reading this description in conjunction with the drawings, in which.

DETAILED DESCRIPTION

Before describing new functionalities that are advantageous for a MT in a communication system such as that described in the Simonsson application in order to be able to receive TV and other multimedia broadcasts with good quality, some of the features of the Simonsson application are set forth below.

Figure 1:
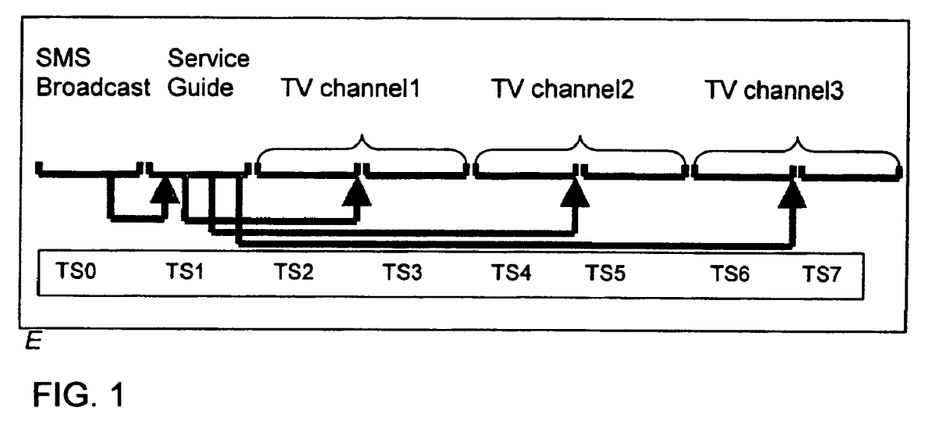
FIG. 1 depicts a broadcast channel having a plurality of timeslots.

FIG. 1 depicts a plurality of timeslots TS0, TS1, TS2, ..., TS7 that are temporal portions of a carrier signal. In GSM/EDGE, TS0 of the BCCH carries SMS information, and an SMS broadcast channel may carry 15 pages with 93 characters.

A pointer or token, such as a character string, that points out an extension channel can be inserted in a time slot, such as in any of the pages broadcast on a typical SMS channel. For example, the string, "Broadcast: BCCH TS1: BBC", could be inserted into a page carried by TS0. As suggested by the string itself and as described in more detail below, such a string can point to another BCCH timeslot or timeslots and indicate information to be found there. In this example, timeslot TS1 of the BCCH has information about a British Broadcasting Corporation (BBC) channel.

It will be appreciated that any suitable pointer can be used, not merely a character string, and that the pointer need only be included in a predetermined slot on virtually any broadcast channel. Moreover, the pointer need not point to a slot or slots on its own channel, but in general can point to any other slot or slots transmitted in the communication system, even slots on traffic channels. In addition, the pointer can include information that is "open", i.e., presented to a user, and information that is "hidden", i.e., information that is used by the user's equipment but need not be presented to the user. Some examples of such hidden information are information on the modulation and coding scheme used for a broadcast channel or channels, and information on which timeslot corresponds to which broadcast channel.

As in the example shown by FIG. 1, the first extension channel carried in a timeslot such as timeslot TS1 and indicated by a pointer such as an SMS character string can advantageously be a service or program guide, which may conveniently but not necessarily look similar to a main page of a conventional text-TV channel. By providing a sufficient number of physical timeslots for the extension channel, several main pages or channels can be pointed out, for example one for each broadcast service node or broadcast production available from the communication system. Three such main pages in timeslot TS1 are indicated by the three arrows that point to respective pairs of subsequent timeslots. It is advantageous for the content of a Service Guide to be continuously updated to the terminal.

One or more suitable pointers such as character strings on a main page can point to another extension channel or channels, which are carried by the additional timeslot(s) pointed out. In the example shown in FIG. 1, an extension channel called TV channel1 is carried by timeslots TS2 and TS3, another extension channel called TV channel2 is carried by timeslots TS4 and TS5, and yet another extension channel called TV channel3 is carried by timeslots TS6 and TS7. Thus, the whole BCCH is indicated as allocated for broadcast channels, but this is not necessary. Moreover, BCCH channels are not the only possibility for broadcast-like information as described above; carriers used for traffic channels (TCHs) in the RAN can also be used. The channels carrying the unacknowledged multimedia information, such as the Service Guide and three TV channels in this example, can be arranged in any suitable way among the allocated timeslots.

Figure 2:
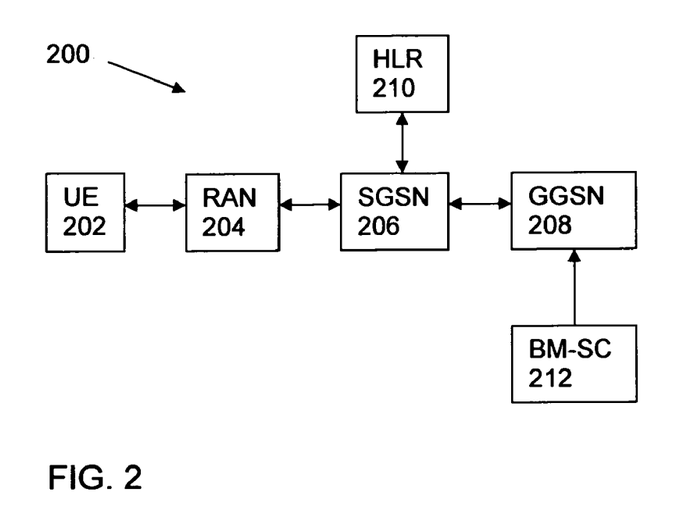
FIG. 2 is a block diagram of a communication system.

FIG. 2 is a block diagram of a communication system 200 that can employ the channel structures described in this application. A mobile terminal, or user equipment (UE) 202, communicates through a radio access network (RAN) 204, such as a GSM/EDGE network, with core-network entities, including a servicing GPRS support node (SGSN) 206, a gateway GSN (GGSN) 208, a home location register (HLR) 210, and a broadcast/multicast service center (BM-SC) 212. The core-network entities are conventional and adapted to handle MBMS and multimedia information generally. In a typical GSM/EDGE network, a PDP Context for administering data flows is set up in the GGSN 208 in response to a request from the MT/UE 202.

In particular, the BM-SC 212 is responsible for providing and delivering mobile broadcast services, and serves as an entry point for content-delivery services or servers that want to use MBMS. It sets up and controls MBMS transport bearers to the RAN 204 and can be used to schedule and deliver MBMS transmissions. The BM-SC 212 can also provide service announcements to UEs that contain information needed to join an MBMS service. The BM-SC 212 can be used to manage security functions specified for multicast mode. The RAN 204 includes one or more base stations and base station controllers, or Node Bs and radio network controllers (RNCs), that are conventional except to the extent that the radio signals transmitted toward the UE include the channel structures described in this application.

A system operator can determine the number of timeslots, service, and quality of its broadcasts by suitable dimensioning. The modulation and coding scheme (MCS) for transmission in the RAN may be chosen based on desired quality, coverage, and frequency plan, and the number of channels allocated for broadcast may be based on capacity and desired service requirement, e.g., the codec bit rate for the desired broadcast TV service. A number of different schemes (MCS-1 to MCS-9) are currently standardized for EGPRS. MCS-1 to MCS-4 use Gaussian minimum shift keying (GMSK) modulation, and MCS-5 to MCS-9 use $(3\pi/8)$ 8-ary phase shift keying (8-PSK) modulation.

As discussed above, an advantage of this arrangement is the absence of a requirement for special interaction between a terminal and a base station. The base station need only continuously transmit unacknowledged multimedia information, and can be unaware of a receiver's position or activation. The terminal selects a channel of the broadcast information and also advantageously selects the best transmitter of that information.

Figure 3:
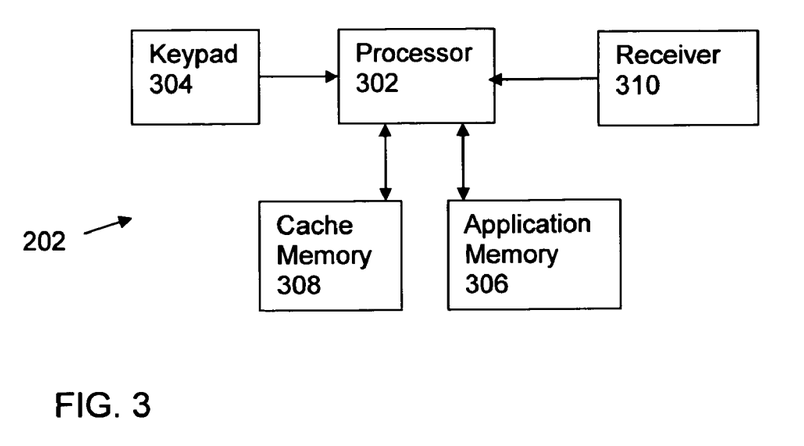
FIG. 3 is a block diagram of a mobile terminal.

FIG. 3 is a block diagram of a MT or UE 202. To facilitate selection of broadcast information, a software application executed by a processor 302 in the terminal 202 may advantageously re-define the terminal's keypad 304. The software application may be stored in a suitable application memory 306 and operate for example such that "1" on the keypad means channel 1, which is then the Service Guide in the arrangement depicted in FIG. 1, "2" on the keypad means channel 2, etc. This is described in more detail below.

The terminal 202 may also download and/or cache desired information in a suitable memory 308 based on user preferences and terminal applications. With cached information, instant channel switching between broadcast TV channels can be done because a streaming buffer need not be initiated. Either all broadcast channels can be downloaded and/or cached or one or more channels can be downloaded and/or cached according to user configuration or previous usage. Non-real time transmissions, e.g., news clips, may be downloaded and dynamically updated via the Service Guide to be viewed at the user's convenience. Time-stamping and storage refresh would then possibly be needed, as well as Service Guide updating. For example, a Service Guide update can be sent with new content (that is described in the update), a respective memory pointer, and a time stamp. The new content can be presented on the broadcast channels and the pointer to the new content can be presented in the Service Guide. In this way, a larger amount of data (clips) can be offered per timeslot without any change in user access delay since the refresh rate can be increased. Although some content may not be real-time and may be viewed at the user's convenience, such content can still be updated with current information.

Broadcasting TV in a GSM/EDGE communication system as described here would typically use unencrypted transmission with unacknowledged-mode radio link control (RLC). Unencrypted transmission is supported in the 3GPP standard, e.g., 3GPP TS 04.64 V8.7.0, General Packet Radio Service (GPRS); Mobile Station—Serving GPRS Support Node (MS-SGSN) Logical Link Control (LLC) layer specification, Rel. 99 (December 2001). If encryption is desired, it can be performed at the application layer or be controlled by subscription. Encrypted channels can be used for "pay" content, such as pay-per-view events.

Ordinary GPRS channels are set up from the BM-SC 212 or other provider of broadcast content to the base stations in the RAN 204. Content changes (within the available broadcast channels' capacity) and quality can be managed by the BM-SC. Also, the BM-SC can change the channel structure or timeslot tree such as that depicted in FIG. 1 below the main-page (timeslot TS1) without changing other parts of the network configuration.

To display real-time TV on a typical mobile phone with acceptable quality may require a data rate of about 40 kbps with no more than perhaps about 2% BLER. The BCCH is typically planned with a frequency reuse factor of 12 to 15, which results in a carrier/interference (C/I) ratio of 10 dB to 12 dB at a cell border. The MCS-5 scheme provides 22 kbps/timeslot and around 1% BLER at a C/I of 10 dB. It will be understood that the "packet error rate" corresponding to a 1% BLER depends on the length of the transmitted IP packets because the transmission is unacknowledged. If further improved BLER is required, then error correction techniques, such as Forward Error Correction (FEC) (e.g., block codes, convolutional codes, Turbo codes, and their variations), could be used, in which case more bandwidth (about 5%-10%) would be required. Using two BCCH timeslots for a TV channel as depicted in FIG. 1 may provide the data rate needed for acceptable quality.

Thus, three TV channels could be served on the BCCH as depicted by FIG. 1, with room for a channel that can be carried by a timeslot with a 22 kbps data rate, which can be a service guide and also information such as text news, photos, and video clips. This channel can transmit information in a cyclic fashion, i.e., all information is not transmitted in each timeslot, and the mobile can store this information for fast access. The information content can be similar to conventional text-TV/Tele-text, or more advanced, with multimedia content including sounds and images.

Figure 4:
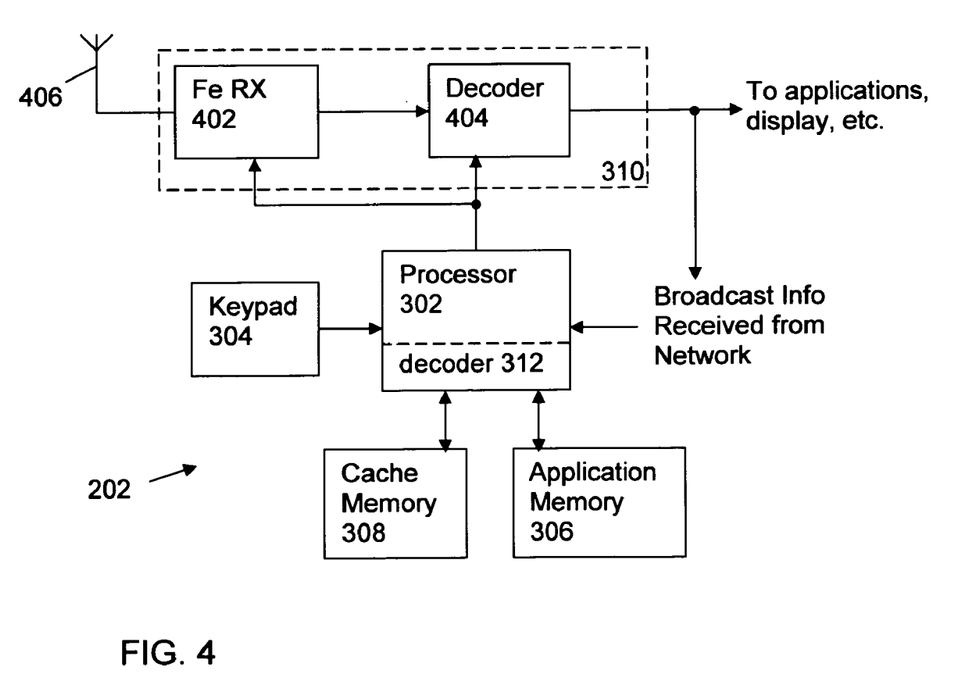
FIG. 4 is a more detailed block diagram of a mobile terminal.

In a system such as that described in the Simonsson application, a TV channel (for instance, channel 2) may be chosen by actuating the "2" key or other suitable key on the keypad. For example, the UE may include keys dedicated for selection of broadcast content. That key-actuation is then interpreted such that the physical layer in the UE (i.e., the receiver 310) should receive and decode time slots 4 and 5 for an arrangement such as that depicted in FIG. 1. A block diagram of a UE 202 having such capability is shown in FIG. 3, and a more detailed block diagram is FIG. 4. Based on user-input information from the keypad, keyboard, or joystick 304 and information about the broadcast system, e.g., the channel guide, which may be received from the network through the receiver 310 as described above, the control processor 302 determines which time slot(s) to receive and decode. The time slot information is then fed both to a front end receiver (Fe RX) 402 and a decoder 404 that are included in the receiver 310. The Fe RX 402 and decoder 404 are the "physical layer" in the UE 202. The Fe RX 402 receives signals captured by a suitable antenna 406 and down-converts those signals to baseband. For power conservation, the Fe RX 402 is turned on during the time slots corresponding to the TV broadcast selected by the user through the keypad 304 so that the broadcast is received and decoded by a suitable multimedia decoder 312, which may be implemented as software executed by the processor 302 or as a hardware device.

Now that some of the features of the Simonsson application have been described above, additional functionalities that are advantageous for a MT in a communication system such as that described in the Simonsson application in order to be able to receive TV and other multimedia with good quality are described below.

Enhanced EDGE Functionality

Figure 5A:
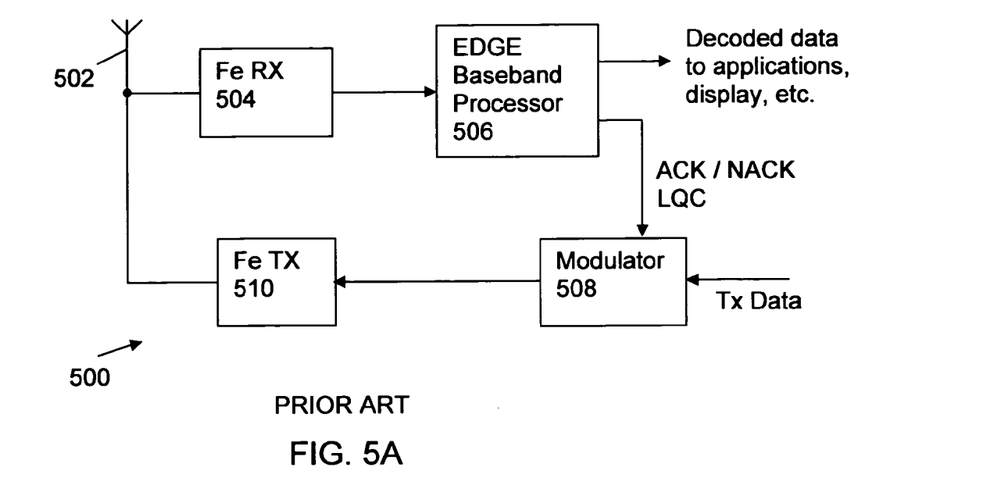
FIG. 5A is a block diagram of a prior art mobile terminal.

A block diagram of a prior art UE 500 capable of receiving and decoding information according to the EDGE (3GPP rel. 5) system is shown in FIG. 5A. The EDGE radio signal is received by an antenna 502 and down-converted to a baseband signal by the Fe RX 504. The baseband signal is then fed to an EDGE baseband processing unit 506, which carries out channel estimation, equalization, de-interleaving, and channel decoding in a manner that is well known in the art, thereby generating decoded data that is provided to the UE's applications, display, etc. In order to optimize the data throughput, link quality measurements are made by the unit 506 and link quality information (LQC) is provided to a modulator 508 for transmission to the base station so that the optimal MCS can be used. Furthermore, ACK/NACK information about whether received data packets have been correctly or erroneously decoded is also fed back to the base station through the modulator 508, a front end transmitter (Fe TX) 510, and the antenna 502. The modulator also receives data (e.g., voice, text, etc.) to be transmitted by the UE 500.

Figure 5B:
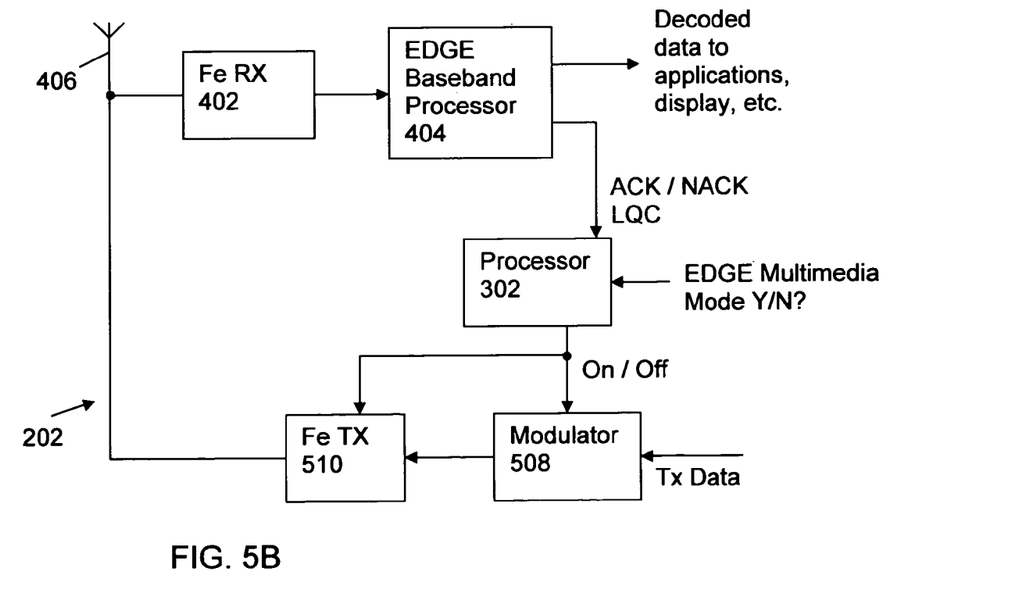
FIG. 5B is a block diagram of an improved mobile terminal.

Feedback information such as ACK/NACK and LQC signaling is not needed in the broadcast mode of EDGE, and so a UE capable of disabling its EDGE feedback information is useful for receiving multimedia over EDGE. FIG. 5B is a block diagram of such a UE 202 that shows an arrangement for disabling EDGE feedback signals. The LQC and ACK/NACK information is fed from the baseband processor 404 to the control processor 302. Whether the user has chosen the multimedia reception mode is indicated to the processor 302 by a suitable yes/no signal, which may be generated by or in response to user inputs to the keypad 304. For example, a yes/no signal may be generated by a user's selecting a channel or content. Based on the yes/no signal, the processor 302 either does not or does feed the ACK/NACK and LQC information to a modulator 508 and either does or does not turn off the Fe TX 510.

Methods of Cell Search and Signal Strength Measurements in Broadcast Mode

Figure 6:
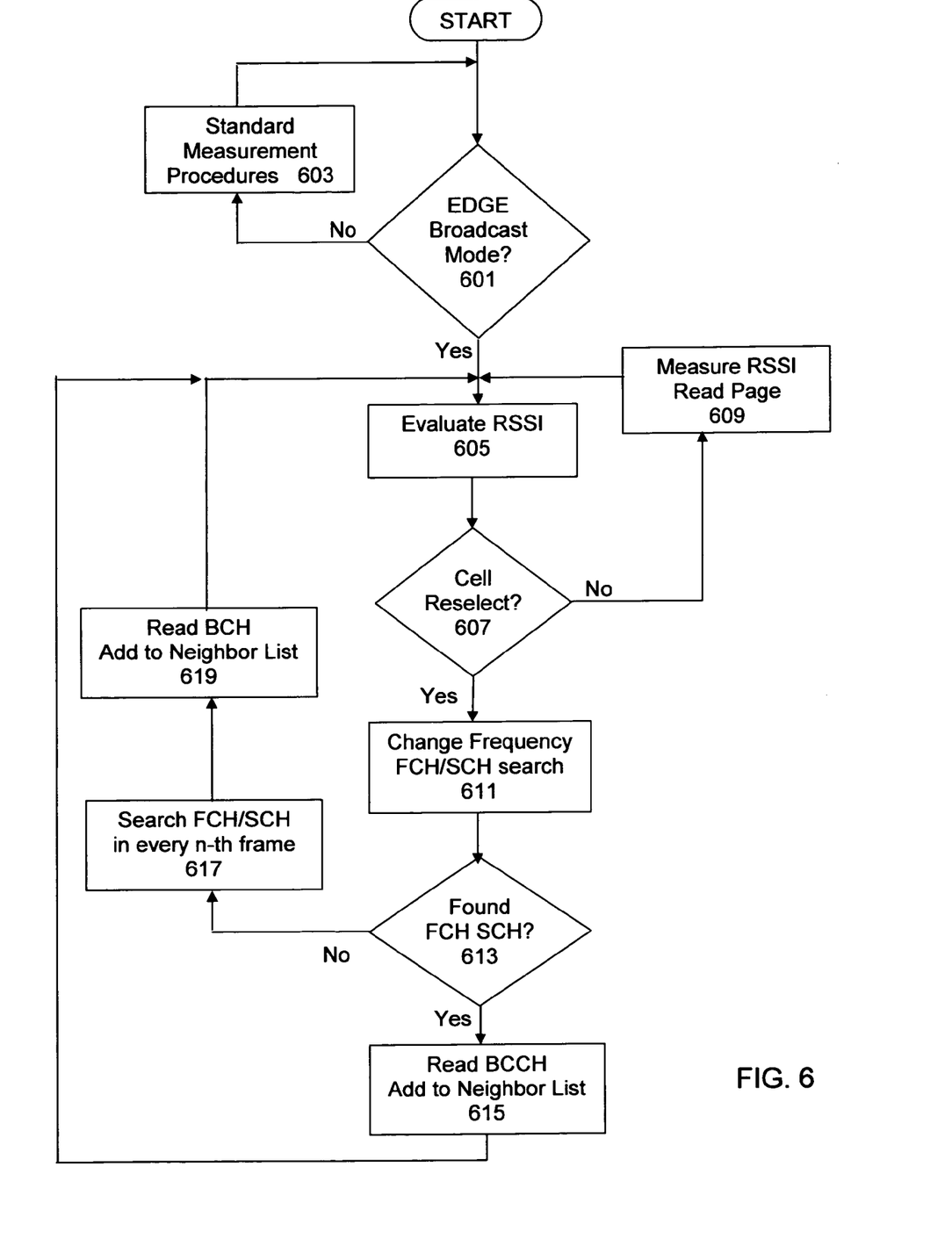
FIG. 6 is a flow chart of a method of scheduling cell search and signal strength measurement.

As the UE 202 may be in idle mode during EDGE broadcast reception, the network has no knowledge about the UE and therefore the reception is not interrupted by commands from a base station for the UE to do the usual measurement procedures, which include determining received signal strength indications (RSSIs) of received cells and carrying out cell search (i.e., frequency correction channel (FCH), synchronization channel (SCH), and broadcast channel (BCH) searches). Nevertheless, the UE should schedule the measurement procedures such that the risk of interrupting the broadcast reception is minimized. A flow chart of such a measurement scheduling method is shown in FIG. 6, and it will be understood that the method can be carried out by a suitably programmed processor 302.

At first, it is determined (step 601) whether the UE 202 is set to receive EDGE content broadcasts as described above. If the UE is idle but not in EDGE broadcast reception mode, the measurement procedure scheduling is done according to well known prior art techniques (step 603). If the UE is in the broadcast-reception mode, the following advantageous measurement schedule is used.

Assume for example that the UE is receiving EDGE broadcasts on time slots $TS_i$, $TS_j$ (collectively labeled $TS_{ij}$). The UE evaluates RSSI measurements of other cells (step 605) at time instants outside of the broadcast reception time $TS_{ij}$, and based on the evaluation (step 607) a cell re-selection is made or not. If not, the UE continues to do RSSI measurements on other known cells at time instants outside the broadcast reception time $TS_{ij}$, and the UE reads page messages sent at the usual time instants in time slot $TS_0$ on the BCCH carrier (step 609). The process flow then returns to the evaluation step 605.

If a cell re-selection is made, the UE changes its reception frequency to the frequency of a carrier signal used in the new cell and reads the broadcast channel, in particular the BCCH in time slot $TS_0$, on the new cell (step 611). If any new cells are found in the neighbor list, the UE starts to search for FCH and SCH for these cells (step 613), and this search is done at time instants outside the broadcast reception time slots $TS_{ij}$ in order not to interrupt the broadcast reception. If a FCH or SCH is found (yes in step 613), the BCCH for that cell is read and the new cell is included in the neighbor list of cells (step 615).

If an FCH/SCH is not found at time instants outside the broadcast reception time slots $TS_{ij}$, this means the timing between the cell in the neighbor list and the camping cell is such that the BCCH time slot $TS_0$ on the neighbor cell collides with the time instant of EDGE broadcast reception. The UE must then interrupt the broadcast reception, but the interruption should be made with minimal degradation of broadcast reception quality. This can be done by interrupting the broadcast reception only every n-th TDMA frame to carry out the FCH/SCH search (step 617). In GSM/EDGE systems, FCH/SCH frames occur every ten TDMA frames on $TS_0$ on the BCCH. Therefore, the FCH/SCH search can be done every 11, 21, 31, ... TDMA frame, in order to eventually find the FCH/SCH bursts. Whether to use 11 or 21 or 31 etc., or another value, depends on the ability of the UE's video decoder to correct and decode erroneous blocks. A suitable value can be obtained from laboratory tests and hard-coded or stored in a memory in the mobile terminal.

When a new cell's FCH/SCH is found, the UE reads the BCH for the new cell and adds the cell to the neighbor list (step 619). The process flow then returns to the evaluation step 605.

This general method can be modified and extended in a number of ways, of course. Two such modifications are described below.

Cell Search Scheduling Based on Information from the Multimedia Decoder

As noted above, the length of time that broadcast reception can be interrupted without large quality degradation heavily depends on the receiving multimedia decoder's ability to correct erroneous or missing blocks. Therefore, a cell search (i.e., FCH/SCH search) can advantageously be scheduled by the decoder 312, which controls when and for how long a time reception can be interrupted.

For instance in a case of cell re-selection, the UE has to change frequency to a new cell. The new cell might not be fully synchronized with the old cell with respect to the broadcast service. (The broadcast service timings in different cells may differ by typically 100 milliseconds or so.) Hence, it can be so that the decoder 312 has to be restarted, introducing an interrupt in the broadcast reception anyway. In such case, a suitable indication of the decoder restart is fed from the decoder 312 to the physical layer processing in the UE, and so during that time, the UE can cell search over the entire TDMA frame in order to find the FCH/SCH bursts for new cells. The decoder 312 (or the processor 302 that runs decoder software) comes to "know" that it has to restart by monitoring frame numbers that are included in the transmitted frames. If a frame number from a new cell is non-aligned with the frame number from the old cell, then the video decoder has to be restarted, and such restart procedure triggers the cell search.

Cell Search Scheduling Based on Information from the EDGE Multimedia System

Another way to minimize the degradation of multimedia quality due to cell search interrupt is to have the network include "idle frames" in the multimedia transmission. An idle frame is an empty frame in which no multimedia data is transmitted, and for example, one or more idle frames can be included at regularly spaced intervals. During the idle frame(s), the UE can do cell search, measurements, etc. The number and periodicity of the idle frames can be chosen such that the multimedia decoder 312 is able to correct for such idle frames.

The periodicity can be signaled to the UE in an SMS broadcast message or in the "service guide" described above. As an alternative, idle frames can be "blindly" detected by the UE, which then derives the periodicity based on the detected idle frames. A UE can blindly detect an idle frame by determining whether a frame includes information or not, and this determination can be easily carried out by either the baseband processor 404 or the processor 302. The baseband processor 404 or processor 302 can also mark the occurrences of idle frames and determine their periodicity therefrom. It will be understood that the periodicity can be the same for all multimedia channels in the system (meaning the UE only needs to determine or be informed of the periodicity once) or can be different for different cells/channels. In the latter case, the UE would determine the idle frame periodicity on a suitable basis, for example after a handover from one cell to another.

One way that blind detection of idle frames can be done is by estimating the received signal energy during a known portion of a time slot, e.g., during a training sequence, in any of several manners that are well known in the art. Because an idle frame does not have a training sequence, the signal energy estimate will be zero or close enough to zero that it will be easily discriminated from signal energy estimates of non-idle frames. The processor 404 or processor 302 can implement a comparator and/or a threshold detector to discriminate idle frames from signal frames. Another similar way to do blind detection is by monitoring the output of the decoder 312. Because an idle frame does not have any decodable content, the output of the decoder 312 for idle frames should be easily discriminated from the output for non-idle frames, even though the decoder should be able to correct for the idle frames as noted above. By detecting idle frames in this way, the periodicity of idle frames can be estimated as described above.

It is expected that this invention can be implemented in a wide variety of environments, including for example mobile communication devices. It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of scheduling received signal measurements in a user equipment (UE) in a communication system, the received signal including broadcast information and being organized in successive frames, comprising the steps of:

evaluating a received signal strength indicator (RSSI) at only time instants outside of a broadcast information reception time, wherein during the broadcast information reception time the UE receives unacknowledged multimedia information, and the evaluating step is performed by the UE based on whether the UE is receiving unacknowledged multimedia information, independent of control by the communication system during a period in which the UE is unknown to the communication system, and during the period during which the UE is receiving unacknowledged multimedia information from the communication system;

based on the evaluated RSSI, carrying out a cell re-selection procedure;

changing a reception frequency to a frequency of a new cell, including checking a list of neighbor cells for the new cell and searching for a physical channel in the new cell at only time instants outside of the broadcast information reception time based on whether the UE is receiving unacknowledged multimedia information;

if the physical channel in the new cell is found, reading a broadcast channel of the new cell and including the new cell in the list of neighbor cells; and if the physical channel is not found at only time instants outside the broadcast information reception time, interrupting the receiving of unacknowledged multimedia information and searching for the physical channel in the new cell at further time instants not only outside of the broadcast information reception time.

2. The method of claim 1, further comprising the step of determining whether the UE is in a predetermined broadcast information reception mode.

3. The method of claim 1, wherein the interrupting step includes periodically interrupting the broadcast information reception every predetermined number of frames to search for the physical channel.

4. The method of claim 1, wherein the physical channel is at least one of a frequency correction channel and a synchronization channel.

5. The method of claim 1, wherein the interrupting step includes interrupting the broadcast information reception by searching for the physical channel in the new cell at time instants indicated by a broadcast information decoder restart signal.

6. The method of claim 1, wherein a broadcast signal transmitted in the communication system includes at least one idle frame, and the interrupting step includes interrupting the broadcast information reception by searching for the physical channel in the new cell during the at least one idle frame.

7. The method of claim 6, wherein the step of searching for the physical channel in the new cell is carried out at regularly spaced time intervals.

8. The method of claim 6, wherein the spacing of the time intervals is determined by the UE from a received message.

9. The method of claim 6, wherein the spacing of the time intervals is determined by the UE from blindly detected idle frames.

10. A user equipment (UE) for receiving radio signals transmitted in a communication system and scheduling received signal measurements, the received signals including broadcast information and being organized in successive frames, the UE comprising:

a receiver configured to produce a baseband signal from a received radio signal;

a baseband processor configured to determine a received signal strength indicator (RSSI); and a controller configured to evaluate the RSSI at only time instants outside of a broadcast information reception time and to cause the UE to carry out a cell re-selection procedure based on the evaluated RSSI, wherein during the broadcast information reception time the UE receives unacknowledged multimedia information, and the RSSI is evaluated by the UE based on whether the UE is receiving unacknowledged multimedia information, independent of control by the communication system during a period in which the UE is unknown to the communication system, and during the period during which the UE is receiving unacknowledged multimedia information from the communication system;

wherein the controller is configured to change a reception frequency to a frequency of a new cell, the change including checking a list of neighbor cells for the new cell and searching for a physical channel in the new cell at only time instants outside of the broadcast information reception time based on whether the UE is receiving unacknowledged multimedia information; if the physical channel in the new cell is found, a broadcast channel of the new cell is read and the new cell is included in the list of neighbor cells; and if the physical channel is not found at only time instants outside the broadcast information reception time, reception of unacknowledged multimedia information is interrupted to search for the physical channel in the new cell at further time instants not only outside of the broadcast information reception time.

11. The user equipment (UE) of claim 10, wherein the controller is further configured to determine whether the UE is in a predetermined broadcast information reception mode.

12. The user equipment of claim 10, wherein the broadcast information reception is interrupted periodically every predetermined number of frames to search for the physical channel.

13. The user equipment of claim 10, wherein the physical channel is at least one of a frequency correction channel and a synchronization channel.

14. The user equipment of claim 10, wherein the controller includes a decoder for decoding the broadcast information, and broadcast information reception is interrupted to search for the physical channel in the new cell at time instants indicated by a decoder restart signal.

15. The user equipment of claim 10, wherein a broadcast signal transmitted in the communication system includes at least one idle frame, and broadcast information reception is interrupted to search for the physical channel in the new cell during the at least one idle frame.

16. The user equipment of claim 15, wherein at least one of the baseband processor and the controller are configured to detect the idle frames and determine a periodicity of the idle frames.

17. The user equipment of claim 16, wherein the idle frames are detected by estimating received signal energies during known portions of the received radio signal and comparing the estimated received signal energies to at least one of a threshold and other estimated received signal energies.

18. The user equipment of claim 16, wherein the controller includes a decoder configured to decode received broadcast information, and idle frames are detected based on an output of the decoder.

19. The user equipment of claim 10, further comprising an input device configured for activation by a user, wherein the controller determines whether the user equipment is in a predetermined broadcast information reception mode based on a signal generated by or in response to a user input to the input device.

20. A computer-readable medium containing a computer program for scheduling received signal measurements in a user equipment (UE) in a communication system when the UE is in a predetermined broadcast information reception mode, the received signal including broadcast information and being organized in successive frames, the computer program causing the UE to perform the steps of:

evaluating a received signal strength indicator (RSSI) at only time instants outside of a broadcast information reception time, wherein during the broadcast information reception time the UE receives unacknowledged multimedia information, and the evaluating step is performed by the UE based on whether the UE is receiving unacknowledged multimedia information, independent of control by the communication system during a period in which the UE is unknown to the communication system, and during the period during which the UE is receiving unacknowledged multimedia information from the communication system;

based on the evaluated RSSI, carrying out a cell re-selection procedure;

changing a reception frequency to a frequency of a new cell, including checking a list of neighbor cells for the new cell and searching for a physical channel in the new cell at only time instants outside of the broadcast information reception time based on whether the UE is receiving unacknowledged multimedia information;

if the physical channel in the new cell is found, reading a broadcast channel of the new cell and including the new cell in the list of neighbor cells; and if the physical channel is not found at only time instants outside the broadcast information reception time, interrupting receiving unacknowledged multimedia information and searching for the physical channel in the new cell at further time instants not only outside of the broadcast information reception time.

21. The computer-readable medium of claim 20, wherein the interrupting step includes periodically interrupting broadcast information reception every predetermined number of frames to search for the physical channel.

22. The computer-readable medium of claim 20, wherein the interrupting step includes interrupting the broadcast information reception by searching for the physical channel in the new cell at time instants indicated by a broadcast information decoder restart signal.

23. The computer-readable medium of claim 20, wherein a broadcast signal transmitted in the communication system includes at least one idle frame, and the interrupting step includes interrupting the broadcast information reception by searching for the physical channel in the new cell during the at least one idle frame.

24. The computer-readable medium of claim 23, wherein the interrupting step includes blindly detecting the at least one idle frame.

\* \* \* \* \*

UNITED STATES PATENT AND TRADEMARK OFFICE
CERTIFICATE OF CORRECTION

| | | |
|---|---|---|
| PATENT NO. | : 7,675,891 B2 | Page 1 of 1 |
| APPLICATION NO. | : 11/226484 | |
| DATED | : March 9, 2010 | |
| INVENTOR(S) | : Lindoff et al. | |

It is certified that error appears in the above-identified patent and that said Letters Patent is hereby corrected as shown below:

On the title page, item (73), under "Assignee", in Column 1, Line 1,
delete "Telefonakiebolaget" and insert -- Telefonaktiebolaget --, therefor.

On the title page, item (56), under "OTHER PUBLICATIONS", in Column 2,
Line 1, delete ""Multiimedia" and insert -- "Multimedia --, therefor.

On Page 2, item (56), under "OTHER PUBLICATIONS", in Column 1, Line 1,
delete "Mobile" and insert -- "Mobile --, therefor.

On Page 2, item (56), under "OTHER PUBLICATIONS", in Column 1, Lines 1-2,
delete "Networks:," and insert -- Networks", --, therefor.

On Page 2, item (56), under "OTHER PUBLICATIONS", in Column 2, Line 21,
delete "Coverage" and insert -- "Coverage --, therefor.

On Page 2, item (56), under "OTHER PUBLICATIONS", in Column 2, Line 21,
delete "UTRAN'," and insert -- UTRAN", --, therefor.

In Column 12, Lines 29-32, in Claim 10, delete "if the physical channel. . . . . .neighbor
cells; and" and insert the same in Line 30, as a new paragraph.

In Column 12, Lines 32-38, in Claim 10, delete "if the physical channel is
not. . . . . .reception time" and insert the same in Line 33, as a new paragraph.

Signed and Sealed this
Fifth Day of April, 2011

David J. Kappos
*Director of the United States Patent and Trademark Office*